United States Patent [19]
Takahashi et al.

[11] Patent Number: 5,124,784
[45] Date of Patent: Jun. 23, 1992

[54] VIDEO SIGNAL PROCESSING APPARATUS

[75] Inventors: Koji Takahashi; Tadayoshi Nakayama; Hiroto Yasumura, all of Kanagawa, Japan

[73] Assignee: Canon Kabushiki Kaisha, Tokyo, Japan

[21] Appl. No.: 625,791

[22] Filed: Dec. 10, 1990

Related U.S. Application Data

[60] Continuation of Ser. No. 369,036, Jul. 24, 1989, abandoned, which is a division of Ser. No. 76,017, Jul. 21, 1987, abandoned.

[30] Foreign Application Priority Data

Jul. 25, 1986 [JP] Japan ................................ 61-173800
Jul. 25, 1986 [JP] Japan ................................ 61-173801
Jul. 25, 1986 [JP] Japan ................................ 61-173802

[51] Int. Cl.$^5$ ............................................ H04N 9/740
[52] U.S. Cl. .................................................. 358/22
[58] Field of Search ............... 358/160, 22, 36, 21, 358/163

[56] References Cited

U.S. PATENT DOCUMENTS

4,134,128 1/1979 Hurst ..................................... 358/22
4,689,660 8/1987 Kashiyl ................................. 358/22

Primary Examiner—James J. Groody
Assistant Examiner—David E. Harvey
Attorney, Agent, or Firm—Robin, Blecker, Daley & Driscoll

[57] ABSTRACT

The video signal processing apparatus of the invention is an apparatus for processing a video signal superimposed on a carrier signal by digitizing. The video signal is sampled at a sampling frequency equal to 2n (where n is 2 or higher integer) times the frequency of the carrier signal to form 2n sample data per period of the carrier signal. After the formed sample data have been memorized in the sampling sequence, the corresponding 2n sample data to one period of the carrier signal are read in a different sequence from that when the aforesaid memorizing was carried out. Thus, the video signal can be processed by using means of simple structure.

5 Claims, 10 Drawing Sheets

VIDEO SIGNAL PROCESSING APPARATUS

This is a continuation application under 37 CFR 1.62 of prior application Ser. No. 369,036, filed Jul. 24, 1989, now abandoned, which is a divisional application of Ser. No. 076,017, filed Jul. 21, 1987, now abandoned.

BACKGROUND OF THE INVENTION

1. Field of the Invention

This invention relates to a video signal processing apparatus employing the technique of digitizing the video signal.

2. Description of the Related Art

Recently, the digital technique has come to be applied even to the field of processing video signals. Particularly in the field of image instruments for use in offices, a wide variety of advantages has been enjoyed. The device for this digital image treatment has to be fabricated to a large scale and, therefore, becomes very expensive. For this reason, its introduction to instruments for public welfare such as home VTRs is in a very difficult situation.

That is, between the home and office instruments there a very large difference in the standard form of video signals, for the former deals with the composite television signals of the NTSC standards, and the latter with the component television signals, namely, either the R, G and B signals for the three primary colors, or the Y, I and Q signals for luminance and chrominances. As will be understood, to meet with the demand for a higher image quality and broader capabilities, the office instruments have employed the method of processing all informations in the form of the component television signals. Compared with the processing of all the informations in the form of the composite television signal, therefore, a far greater quantity of information must be processed. This leads to the necessity of a large increase in processing power per unit time and capacity of memory. From this reason, the necessary prerequisite for introduction of the digital image processing capability into the home instrument is to use the composite television signal when the processing to digital signals is performed, in other words, to carry out the direct encoding treatment. Further, for another treatments such as drop-out compensation or the like, in order to ensure continuity of the color subcarrier, an inverting circuit for the digital data becomes necessary.

Figure 1:
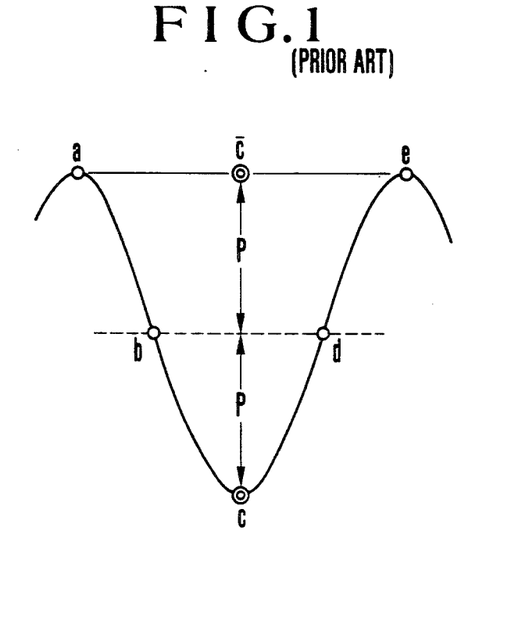
FIG. 1 is a graph explaining the inversion of phase of the chrominance signal used in the prior art.

The above-identified inverting circuit for the so-called chrominance signals has so far been designed on the principle shown in FIG. 1, where the chrominance signal of the video signal or the television signal of the NTSC standards is sampled at a rate of 4 times the frequency fsc of the color subcarrier or 4 fsc's. From among the sample data, a-e, of the chrominance signal, only the phase of the sample datum, c, is inverted. Hence, that inverted datum, $\bar{c}$, is computed. Concretely speaking, the center value of the amplitude of the chrominance signal is regarded as the value of a line segment b–d as shown by a dashed line in the figure. Then, the inverted datum $\bar{c}$ is sought so that the position of bisecting the distance between the level of the inverted datum $\bar{c}$ and the sample datum c becomes the position of the above-described line segment b–d. And, on assumption that the correlativity of the signal lies near the sample datum c, the value of the inverted datum $\bar{c}$ is found as the mean value of the data a and e ($\bar{c}=(a+e)/2$). Thus, to obtain the inverted datum $\bar{c}$, it is necessary to perform addition of the data a and e once, and division of it once, in total, two computations.

Figure 2:
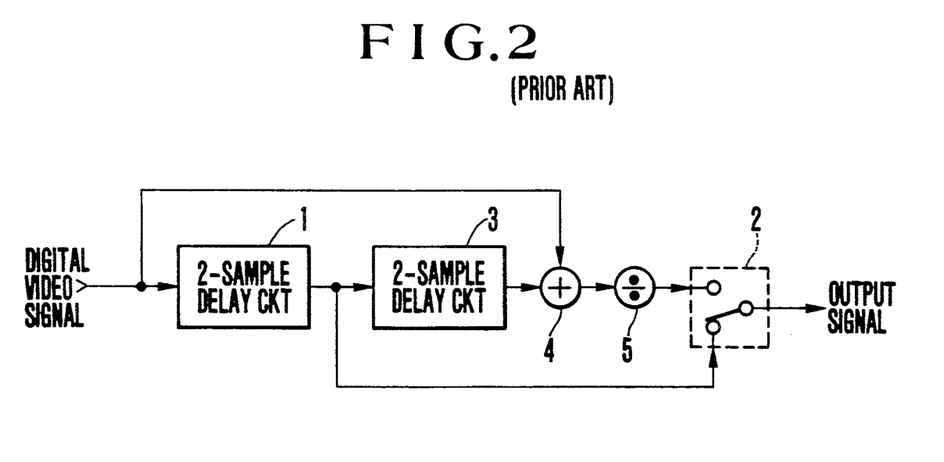
FIG. 2 is a block diagram of the circuitry of the conventional video signal reproducing apparatus.

FIG. 2 is a block diagram illustrating the circuit structure of the conventional video signal reproducing apparatus which performs computation based on the above-described formula. As has been described above, the inputted video signal is sampled at the frequency of 4 fsc's in synchronism with the color subcarrier, and this quantized digital video signal is applied to a 2-sample delay circuit 1. For the video signal not to be inverted, a selection switch circuit 2 allows the output of the delay circuit 1 to pass directly to an outlet. For the inverting purpose, on the other hand, the output of the first delay circuit 1 is applied to a second 2-sample delay circuit 3. Then, its output representing the video signal delayed 4 samples in total (corresponding to the datum e of FIG. 1) is added to the present signal (corresponding to the datum a of FIG. 1) by an adder 4. The output of this adder 4 is halved by the 1-bit shifting treatment in an divider 5. The thus-obtained datum is used as the inverted datum $\bar{c}$ of FIG. 1. The switch circuit 2 passes it to the outlet.

However, such a chrominance signal inverting circuit in the conventional video signal processing apparatus is, because of its having two computing treatments, associated with circuits of complicated structure. Hence, a problem arose that no simple form could be attained. Moreover, when processing the digital image informations, it is impossible with the composite television signal that its sampled data, without further alternation, are subjected to addition and subtraction. Hence another problem arose that the computing circuit and others were necessarily be formed to a large scale.

Figure 3:
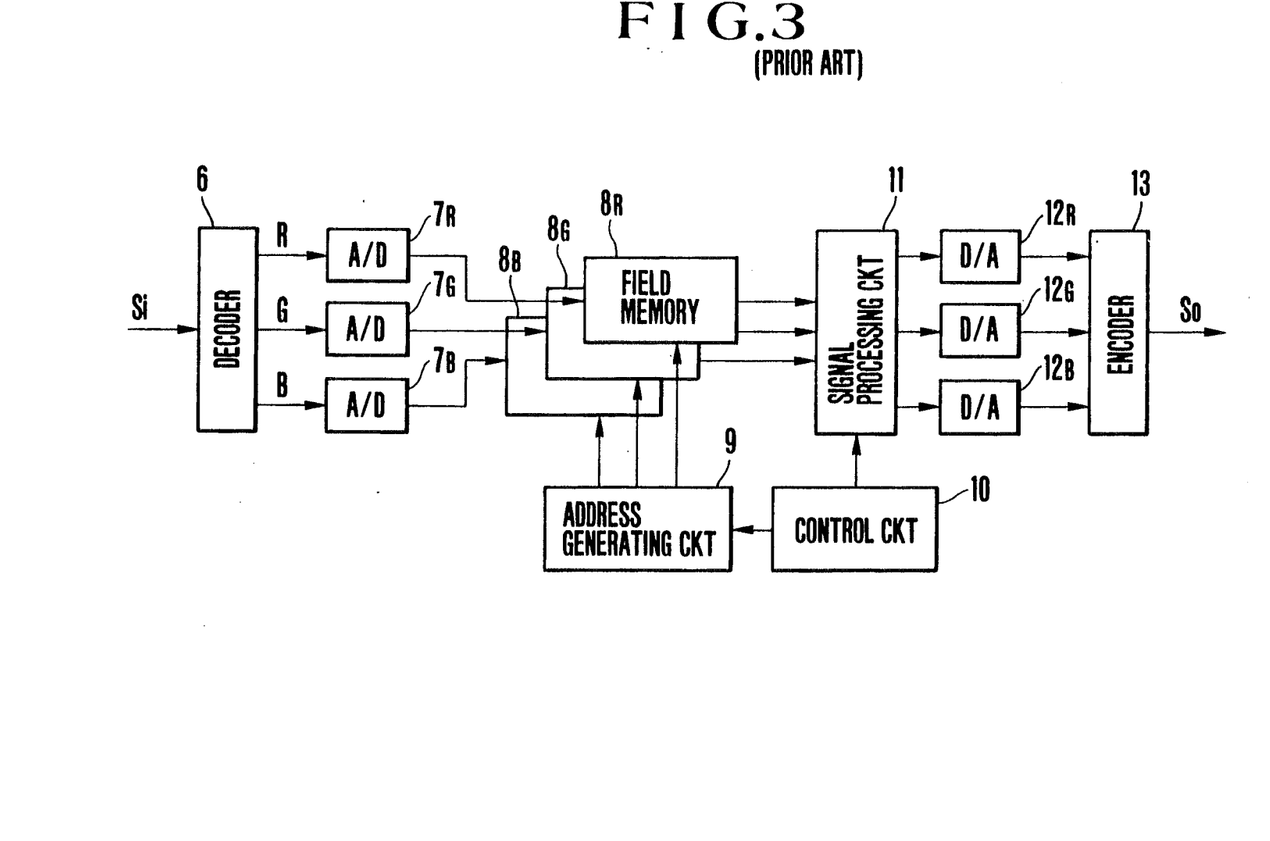
FIG. 3 is a block diagram of the circuitry of the conventional video signal processing circuit having the capability of enlarging or reducing the size of image.

FIG. 3 also illustrates the circuit structure of the conventional video signal processing apparatus but with the capability of enlarging or reducing the image size. The composite television signal Si of the NTSC standards from the inlet first enters a decoder 6 which in turn produces three color signals R, G and B for red, green and blue as corresponding to the component television signals. These color signals R, G and B are then quantized by respective A/D (for analog/digital) converters $7_R$, $7_G$ and $7_B$. The outputs of these converters in the form of digital signals are applied and stored as the picture elements to and in respective field memories $8_R$, $8_G$ and $8_B$.

Figure 4A:
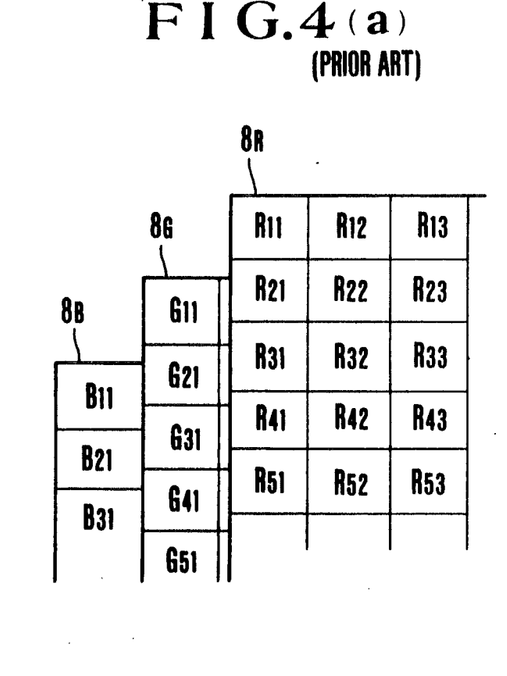
FIGS. 4(a) and 4(b) illustrate the array of the data Xij for the picture elements Pi of one field stored in the memories $8_R$, $8_G$ and $8_B$ of FIG. 3.
Figure 4B:
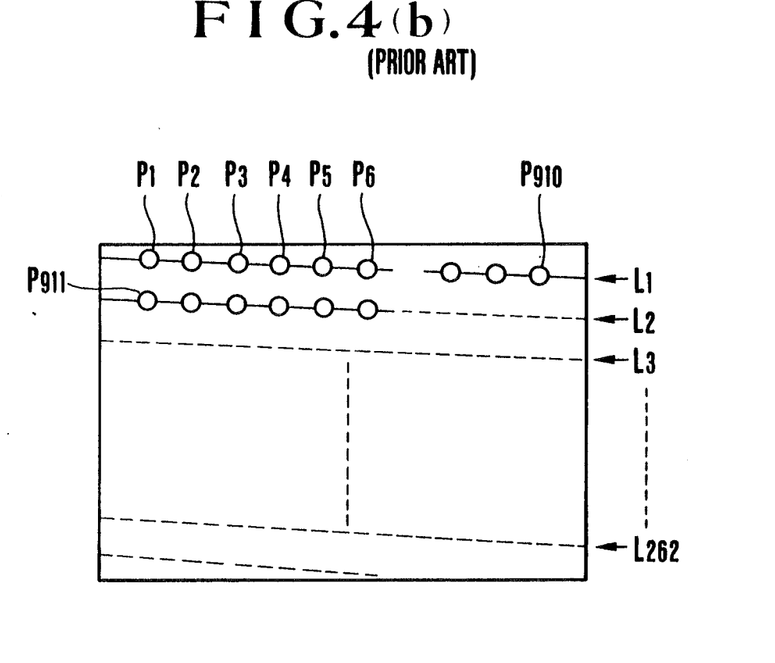

FIGS. 4(a) and 4(b) illustrate how the data $X_{ij}$ (i, j = 1, 2, 3, ...) for the picture elements Pi (i = 1, 2, 3, ...) are arrayed over one field in the aforesaid memories $8_R$, $8_G$ and $8_B$. As shown in FIG. 4(a), for the picture elements $P_1$, $P_2$, $P_3$, ..., $P_{910}$ from the first horizontal scanning line, the corresponding data $X_{11}$, $X_{12}$, $X_{13}$, ... with their components Rij, Gij and Bij of the colors R, G and B are written successively on the memories $8_R$, $8_B$ and $8_B$ respectively at their first rows. Then, in their second rows are written the data $X_{21}$, $X_{22}$, $X_{23}$, ... for the picture elements $P_{911}$, $P_{912}$, $P_{913}$, ... Here, the locations of the picture elements Pi in the entire area of the picture frame are indicated in FIG. 4(b). In the same figure, $L_K$ (k = 1, 2, 3, ..., 262) denotes the scanning line number.

Figure 5:
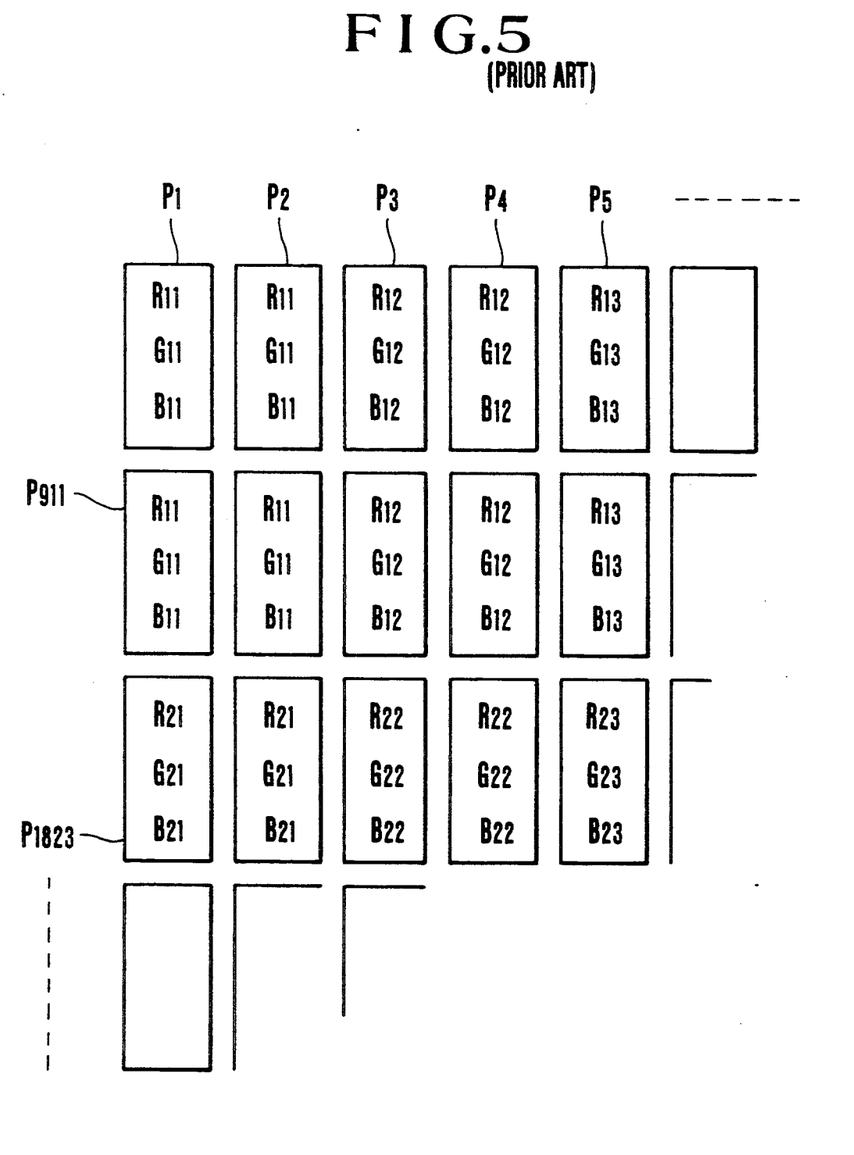
FIG. 5 is a diagram explaining how to read the data from the memories $8_R$, $8_G$ and $8_B$ of FIG. 3.

Next, how to read the stored data out of the memories $8_R$, $8_B$ and $8_B$ is explained. An address generating circuit 9 produces outputs each representing a pattern of addresses indicated by a control circuit 10. Based on this pattern, one reaches the sequence of the data to be read from each of the field memories $8_R$, $8_G$ and $8_B$. In the case when an enlarged picture of, for example, 2×2 times area is to be reproduced, the same data are read twice for either of the horizontal and vertical directions as shown in FIG. 5. As a result, for every one of the 4 (=2×2) picture elements at the corners of a square, one of which the picture element $P_1$ shown in FIG. 4(b) occupies, the data ($R_{11}$, $G_{11}$, $B_{11}$) which were written in connection with the picture element $P_2$ are read out. Similarly, as to the next square to be placed on the right side, which includes the second picture element $P_2$, the reading of the data ($R_{12}$, $G_{12}$, $B_{12}$) which were written in connection with the picture element $P_2$ is repeated 4 times successively. Subsequently, in a similar manner, the data of each of the remaining picture elements are read in allocation to the four corners of the corresponding one of the remaining squares. And, if necessary, any adjacent two of the picture elements are averaged by a signal processing circuit 11. During this time, the control circuit 10 takes the synchronism between the timings of reading of the above-described data and their computation. After that, by D/A (for digital/analog) converters $12_R$, $12_G$ and $12_B$ independent of one another for the individual signals of R, G and B, the above-described signals of R, G and B are returned back to the analog signals. In the next stage of an encoder 13, a composite television signal $S_0$ in the duplicated form for the enlarged picture is produced at an outlet of the apparatus.

The foregoing is the common practice in the prior art of the video signal processing apparatus having the capabilities of enlarging and reducing the size of picture. Because an equal number of sets of the field memory and A/D and D/A converters to the number of components of the video signal are necessary; though the signal processing circuit for enlarging and reducing the size of picture can be constructed itself in simple form, the scale of the entirety of the apparatus becomes very large. Hence, an additional problem arose in that a desired reduction of the production cost of the apparatus was difficult to achieve.

SUMMARY OF THE INVENTION

An object of the invention is to provide a video signal processing apparatus which can solve the above-described problems.

Another object is to provide a video signal processing apparatus which makes no use of complicated computing treatments so that the video signal can be processed by circuitry of simple structure.

Under such an object, according to the present invention, in an embodiment thereof as applied to the video signal processing apparatus having a capability of digitizing the video signal superimposed on the carrier signal, provision is made of:

sample data forming means for sampling the aforesaid video signal at a frequency equal to 2n (where n is an integer of not less than 2) times the frequency of the aforesaid carrier signal to form n sample data per period of the aforesaid carrier signal;

memory means for memorizing the sample data formed by the sample data forming means; and control means operating in such a manner that the sample data formed by the sample data forming means are memorized in the memory means in the aforesaid sampling order, and the 2n ones of the sample data memorized in the memory means which correspond to one period of the carrier signal are read from the memory means in a different order from that used in memorizing.

Another object of the invention is to provide a video signal processing apparatus capable of applying to the video signal a special treatment of enlarging or reducing the size of picture reproduced.

Under such an object, according to the present invention, in an embodiment thereof as applied to the video signal processing apparatus in which the video signal superimposed on a carrier signal is processed by digitizing, provision is made of:

sample data forming means for sampling the video signal at a frequency equal to n (where n is a positive integer) times that of the carrier signal to form n sample data per period of the carrier signal;

memory means for memorizing the sample data formed by the sample data forming means; and write/read control means operating in such a manner that the sample data formed by the sample data forming means are written in the memory means, and, when reading the sample data for one picture frame from the memory means, the reading of the same sample data whose unit to be read is the corresponding n sample data to one period of the carrier signal is repeated m (where m is an integer of not less than 2) times depending on the magnitude of enlargement of the size of picture.

Other objects and features of the invention than those described above will become apparent from the following detailed description of embodiments thereof by reference to the accompanying drawings.

DETAILED DESCRIPTION OF THE PREFERRED EMBODIMENTS

In the following, a first embodiment of the invention is explained.

Figure 6:
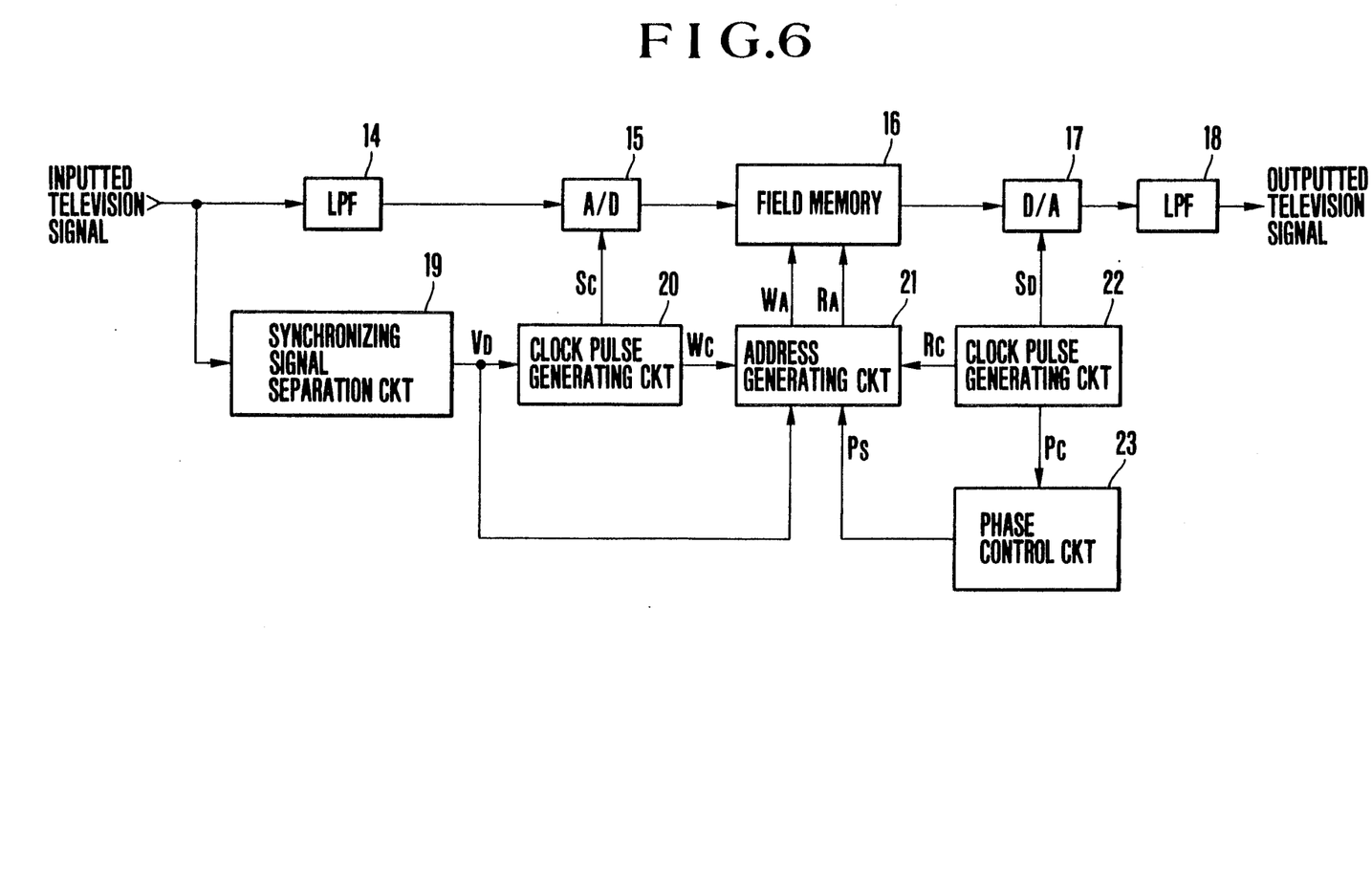
FIG. 6 is a block diagram of the essential parts of a first embodiment of the video signal processing apparatus according to the present invention.

FIG. 6 in block diagram illustrates the essential parts of the video signal processing apparatus according to this embodiment. In the FIG., 16 is a field memory in which the video data that have been quantized through an LPF (low pass filter) 14 and an A/D (analog/digital) converter 15 are written according to the write instruction. By a phase control circuit 23, the written data in the aforesaid memory 16 is delimited in each period of the color subcarrier, and the thus-partitioned data set is then read in reversed sequence to the write sequence. The read data are processed through a D/A (digital/analog) converter 17 and an LPF 18, before they are produced at the outlet of the apparatus. A synchronizing signal separation circuit 19 for the video signal from the inlet, two clock pulse generating circuits 20 and 22 for producing write-pulses and read-pulses, and an address generating circuit 21 for indicating the address of the field memory 16 are further included.

In operation of the circuit of construction described above, a television signal according to, for example, NTSC standards, from the inlet is sampled by the A/D converter 15 at a frequency equal to 2N (where N is 3 or higher integer) times the color subcarrier frequency.

The television signal is also routed to the synchronizing signal separation circuit 19 by which a vertical synchronizing signal (VD) is separated out. The separated signal VD is supplied to the clock generating circuit 20 and the address generating circuit 21. Responsive to this, the clock generating circuit 20 produces a sampling clock signal Sc whose frequency is 2N times as high as the color subcarrier frequency fsc in synchronism with the signal VD. As the above-described operation of the A/D converter 15 is controlled by this sampling clock signal Sc, the thus-sampled and digitized television signal is written in the field memory 16 in synchronism with a write clock signal $W_C$ of the same frequency as that of the sampling clock signal Sc produced from the clock generating circuit 20, while their addresses are indicated by a write-addressing signal $W_A$ produced from the address generating circuit 21.

In such a manner is controlled the writing of the digital television signal in the memory 16 so that what has been stored in the memory 16 is in the form of the partitioned data sets each in one period of the color subcarrier. That is, in the case when the television signal is sampled at the frequency of 2N fsc's, the written data are delimited to every 2N sample data. The reading operation of the memory 16 is controlled by the read-addressing signal $R_A$ produced from the address generating circuit 21, which is indicated by the phase control circuit 23, so that the above-described digital television signal is read in the above-described partitioned data sets from the field memory 16.

Figure 7:
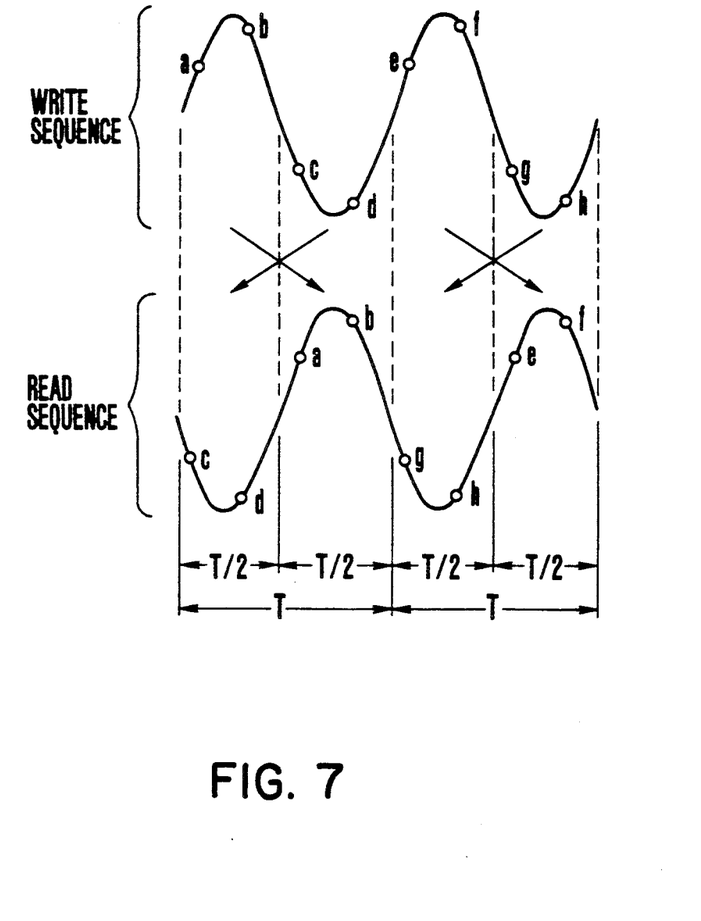
FIG. 7 is a graph explaining the principle of read of the data from the field memory as controlled by the phase control circuit in the video signal processing apparatus of FIG. 6.

FIG. 7 is a graph schematically illustrating the operation of reading the data from the field memory 16 controlled by the phase control circuit 23 of the video signal processing apparatus shown in FIG. 6.

In FIG. 7, the data of each sample point a–h of the signal, when in writing, are written in the memory 16 in the order of a to h. When in reading, the data of the sample points a–h are read in the reverse direction in each half period T/2 of the color subcarrier.

In the address generating circuit 21, at first, the vertical synchronizing signal VD of the next field in the inputted television signal is used as the reset pulse so that it is reset so as to read the sample data $D_1$ corresponding to the left hand upper corner of the picture frame. When not inverting the chrominance signal, it counts up address in the given sequence. When inverting the chrominance signal, it skips over accessing by 2 samples in response to the phase control signal Ps from the phase control circuit 23 and the data in the next or second partition are read in the same order when in writing. After that, the data in the skipped first partition are read in the same order when in writing. Then, a jump to the head sample point of the third partition occurs. Such a procedure is repeated. For note, here, if, as has been described above, the data in the even-numbered partition within one period of the color subcarrier (the partition of the second half period) is at first read, and the data in the odd-numbered partition (the first half period) are later read, in the case when the video signal has been sampled at 4 times the color subcarrier, because one line has 910 samples, the last two samples fall in the odd-numbered partition. So, as the inverted data of these two samples, the 907th and 908th sample data of the last even-numbered partition have to be read.

The thus-read data are then applied to the digital-to-analog (D/A) converter circuit 17 where the analog television signal is retrieved in synchronism with a clock signal $S_D$. After the surplus frequency components have been removed by the LPF 18, it is produced at the outlet. In such a manner, by changing the method of reading the sample data with the use of the phase control circuit 23, the phase inversion is realized without the necessity of any computing treatment, and the structure of construction of the apparatus becomes simple. Also, in this embodiment, an example of sampling the data to be written in the field memory 16 at 4 times the color subcarrier frequency has been shown. But, this sampling frequency may be varied provided that it is equal to even number times the color subcarrier frequency.

Figure 8:
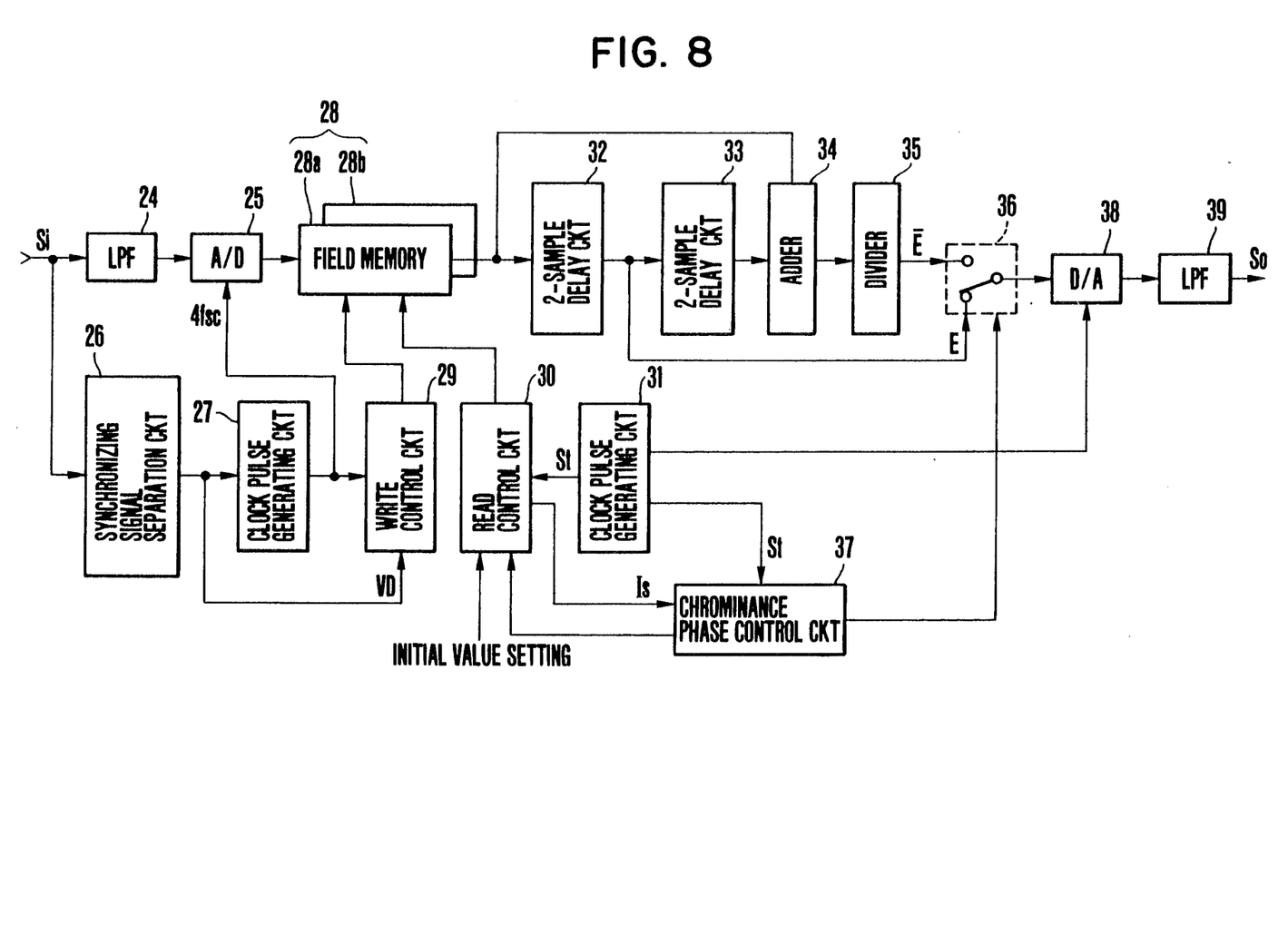
FIG. 8 is a block diagram of the circuitry of a second embodiment of the video signal processing apparatus according to the present invention.

A second embodiment of the invention is described below. FIG. 8 is a block diagram illustrating the circuit structure of the video signal processing apparatus to which the invention is applied as the second embodiment of the invention. In FIG. 8, at first when a composite television signal Si of the NTSC standards with the color subcarrier modulated by the color signals and frequency-multiplied on the luminance signal enters, this analog composite television signal Si is band-limited by an LPF 24, and converted to digital television data by an A/D converter 25. The quantized number of sampling in this A/d converter 25 is in the order of 6 to 8 bits, being taken at a desired value depending on the required image quality.

Meanwhile, the inputted composite television signal Si is applied to a synchronizing signal separation circuit 26 where the $f_H$-Sync (horizontal synchronizing) signal, the VD (vertical synchronizing) signal and the burst signal of the color subcarrier frequency fsc are extracted. And, based on these signals, a clock generating circuit 27 causes a PLL (phase synchronism control) circuit of the frequency 4 fsc's to lock. By the signal of this PLL circuit, the sampling timing of the above-described A/D converter 25 is determined. Also, by the above-described VD signal, a write control circuit 29 for a field memory 28 is reset so that the write address is reset. Here, in the case of using, for example, two field memories 28a and 28b, each time the edge of the VD signal enters, the zero address of the field memory 28a and the zero address of the field memory 28b each are generated alternately. Subsequent to this generation of the zero address, each time the clock pulse from the clock generating circuit 27 enters, the address is counted up one by one as 0 1 2 3 and so on. And, based on this generated address, the digital television data from the A/D converter 25 are written in the field memory 28. At this time, as the data of one picture frame have been written in the field memory 28, when the edge of the next VD signal enters, the write address transits to the zero address of the field memory 28b. Thus, the writing operation of the field memory 28a terminates. When the writing is complete, the field memory 28 is then accessed by a read control circuit 30 for the written digital television data. That is, in synchronism with the read-clock pulse from a clock generating circuit 31, the television data for one field are read and supplied to the next stage of blocks 32 to 36 constituting a chrominance phase inversion circuit system. The operation of a switch circuit 36 of this inversion circuit system is controlled by a chrominance phase control circuit 37 in such a manner that when inverting the phase, it takes its $\bar{E}$ position, and when not inverting, its E position. Then, the digital television data are returned to the analog signal by a D/A converter 38. Through a LPF 39 of the same characteristics as those of the input side LPF 24, it is produced as the composite television signal of the NTSC standards at the outlet.

Next, the operations of the above-described chrominance phase inversion circuit system and the chrominance phase control circuit 37 are described in detail.

Figure 9:
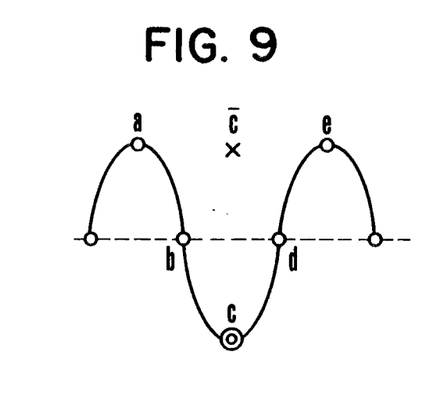
FIG. 9 is a graph schematically illustrating the operation of the chrominance phase inversion circuit system of FIG. 10.

FIG. 9 schematically illustrates the operation of the chrominance phase inversion circuit system. As has been described above, the inputted composite television signal is sampled at a frequency equal to 4 times the frequency fsc of the color subcarrier. These quantized digital television data are supplied to a first 2-sample delay circuit 32. Here, when not inverting the digital television data, the delayed data by this delay circuit 32 are applied through the selection switch circuit 36 directly to the D/A converter 38 without further alternation of the above-described digital television data (corresponding to the data c of FIG. 9). When inverting them, the output of the first delay circuit 32 is applied to a second 2-sample delay circuit 33. The output of this delay circuit 33 which represents the digital television data delayed 4 samples in total (corresponding to the data e of FIG. 9) is added to the present digital television data (corresponding to the data a of FIG. 9) by an adder 34. The addition result of this adder 34 is halved by a divider 35. In other words, the level of the inverted digital television data is sought so that the position of bisecting the difference between the levels of the digital television data c (marked by a double circle in FIG. 9) and its inverted digital television data $\bar{c}$ (marked by x in FIG. 9) coincides with the position of the line passing through the data b and d of FIG. 9. As the mean value of the levels of the data a and e is sought the level of the inverted digital television data $\bar{c}$. The digital television data obtained in such a way becomes the inverted digital television data $\bar{c}$ of FIG. 9, being outputted through the above-described switch circuit 36.

On the other hand, a clock generating circuit 31 produces clock pulses as the reference synchronizing signal. This circuit 31 also produces a start signal St for reading the television signal (corresponding to the above-described VD signal) which is applied to a chrominance phase control circuit 37 and a read control circuit 30. Responsive to this start signal St, the read control circuit 30 reads in the initial address value. From here, the reading of the television data is started. At this time, in the case when the image size is enlarged 2×2 times, because, as has been described above, the television data have been sampled at 4 fsc's, every 4 samples constitute one period of the composite television signal Si. After the television data of 4 samples have been read, the address is counted down −4. Then, the counting up by +1 from this value is repeated. After the data of the 5th sample from the data in the initial address value has been read, the above-described reading operation is repeated for the data of every 4 samples. After the data of one line (half of the line on the memory) have been read, the read control circuit 30 returns to the earlier address by one line again, and repeats the above-described operation. The number of times this operation is repeated is 2 in correspondence to the enlarging rate of 2 in the vertical direction. Also, during this time, in order to establish conformity to the NTSC standards, the phases of the television data read in each line must be inverted. Hence, the read control circuit 30 gives a phase inversion start signal Is to the chrominance phase control circuit 37. The chrominance phase control circuit 37 then moves the switch 36 to its $\bar{E}$ position.

In such a way, by recycling the reading in a unit of 4 samples (or the corresponding number of samples to one period of the composite television signal) it is made possible to carry out such a special processing of the data as to enlarge the image size without involving any alternation of the composite television signal. It is also possible to reduce the image size by controlling the reading in such a manner that the television data memoried on the field memory 28 are skipped over prescribed intervals.

Figure 10A:
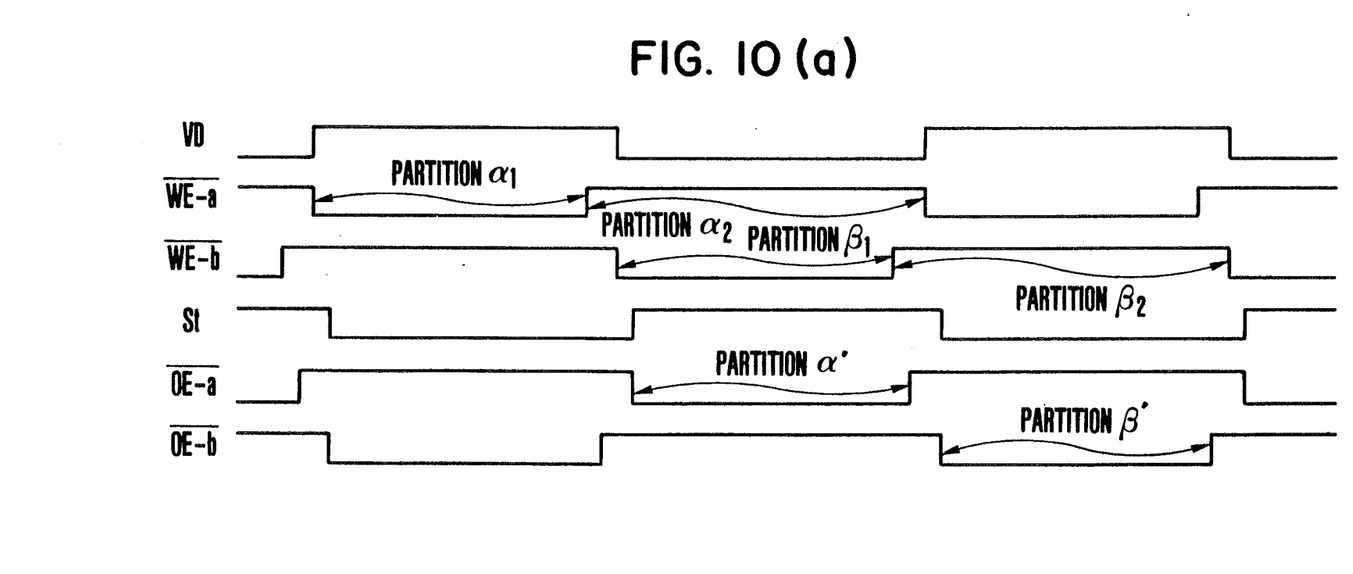
FIGS. 10(a) to (c) are pulse timing charts illustrating a manner in which the operation of writing and reading the data in and from the field memory of FIG. 8 is controlled with the addressing, and the production of the phase inversion start signal Is from the output of the read control circuit is controlled with the addressing.
Figure 10B:
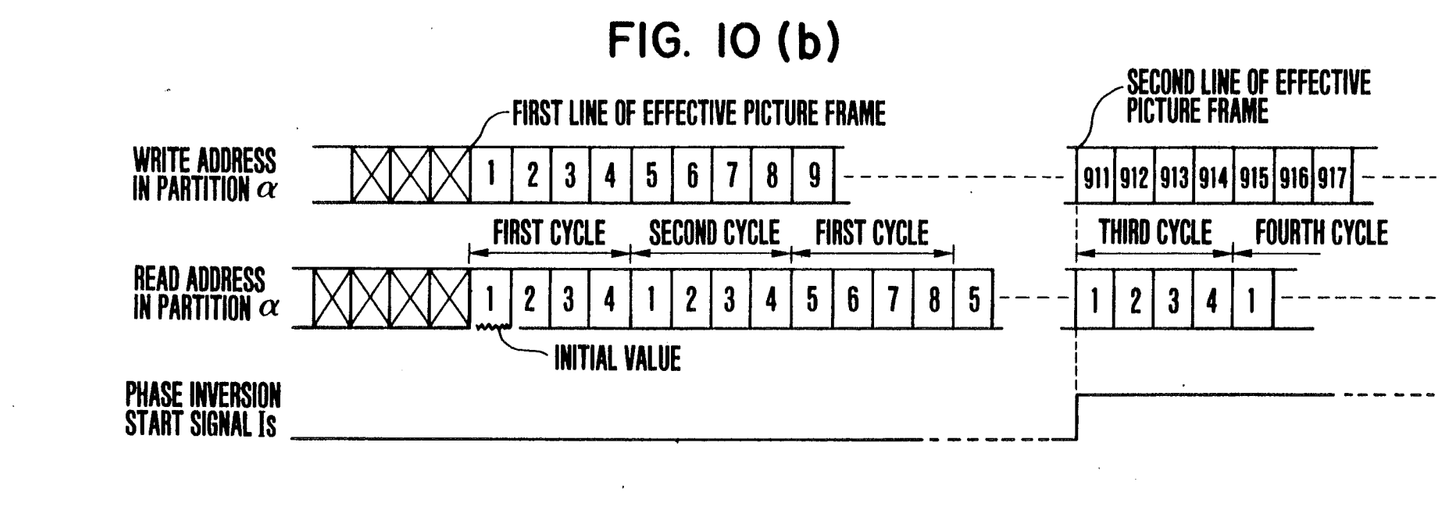
Figure 10C:
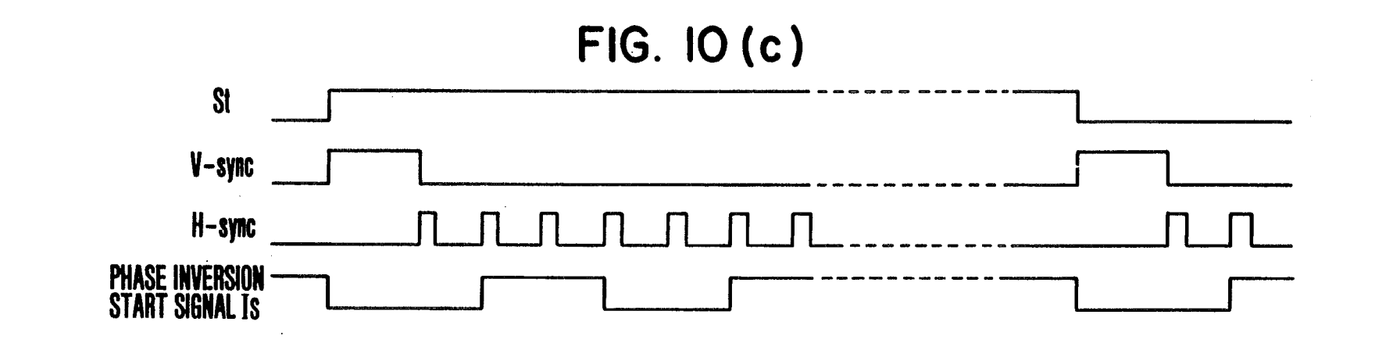

FIGS. 10(a), 10(b) and 10(c) are charts illustrating the timings of the above-described writing and reading, an example of the address indication, and the output timing of the phase inversion start signal Is from the read control circuit 30 in response thereto.

The VD signal shown in FIG. 10(a) is H (high level) for the odd-numbered field of the composite television signal, and L (low level) for the even-numbered field. The levels of write-enable pulses WE-a and WE-b change in correspondence with the edges of this pulse signal. The pulse WE-a becomes L when the edge of the VD signal rises. In this state, writing of the memory 28a becomes possible. And, at the termination of the writing of the television data corresponding to the effective picture frame of the composite television signal, it returns to H. The pulse WE-b becomes L when the edge of the VD signal falls. At this time, writing of the memory 28b becomes possible. And, it returns to H when the writing of the television data corresponding to the effective picture frame of the composite television signal ends.

Also, the data written in the partition $\alpha_1$ shown in FIG. 10(a) may be read in the partition $\alpha_2$. The data written in the partition $\beta_1$ may be read in the partition $\beta_2$. OE-a, OE-b are read-enable pulses. When pulses are L, a readable state is obtained. The pulses OE-a and OE-b become L in the partitions $\alpha'$ and $\beta'$ of FIG. 10 in synchronism with the television data read start signal St (corresponding to the above-described VD signal). And, during the period when the pulse OE-a is L, the reading of the television data from the field memory 28a is carried out. During the period when the pulse OE-b is L, the reading of the television data from the field memory 28b is carried out.

FIG. 10(b) is a diagram illustrating the generating state of the read addresses for the 2×2 enlargement of the image size with the initial address value of "1". When the phase inversion start signal Is is H, the television data are inverted. Also, as shown in FIG. 10(c), the above-described phase inversion start signal Is inverts once for every two rising edges of the horizontal synchronizing signal (H-sync).

Figure 11:
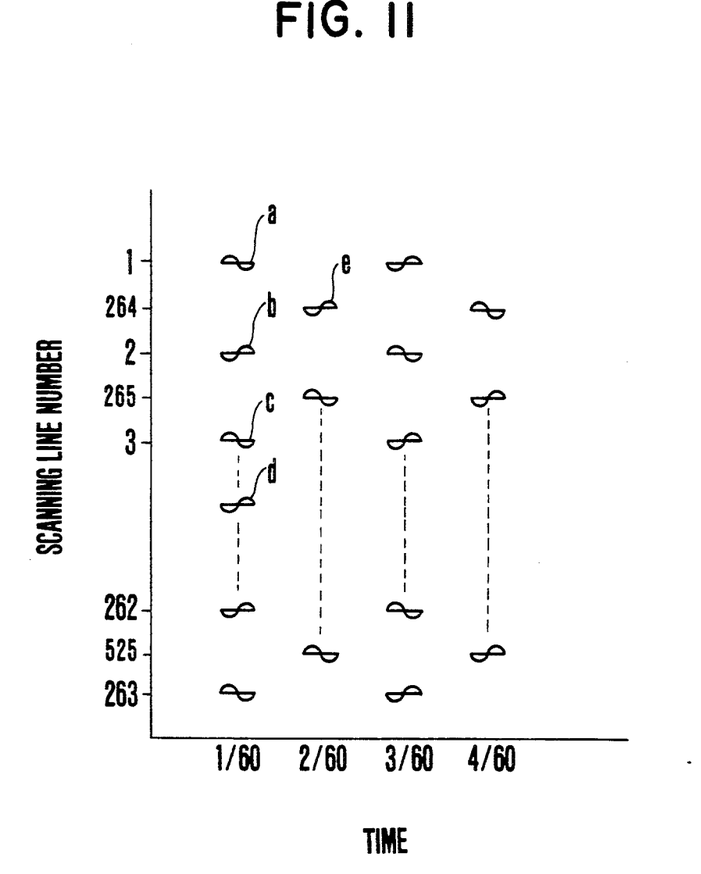
FIG. 11 is a graph illustrating the variation of the phase of the color subcarrier from scanning line to line in the composite television signal of the NTSC standards.

FIG. 11 illustrates the change of the phase of the color subcarrier with each scanning line in the composite television signal of the NTSC standards. For note, in the graph, ⌒ and ⌒ represent the opposite phases to each other. Since, in this embodiment, the composite television signal of the NTSC standards as shown in FIG. 11 are directly digitized, in order to read the television data from the field memory by the addresses as shown in FIG. 10(b) to generate the television data representing an enlarged image of 2×2, the phase inversion start signal Is is generated in the period shown in FIG. 10(c) to perform phase inversion of the television data.

As has been described above, in the case when video signal treatments, particularly special video signal treatment for enlargement or reduction of the image in the television signals, are carried out, there is an event of using the same television data a plurality of times, or of skipping the television data. In the embodiment of the invention, the color subcarrier is modulated by the color signal. Therefore, the continuity of the phases of the color subcarrier is in question. But, in this embodiment, with the composite television signal having the above-described color subcarrier frequency-multiplied, as it is, this continuity of the phases can be assured. That is, one period of the color subcarrier is taken as the base unit of the video signal treatment. For example, in the case of the digital television data sampled at 4×fsc (4 times the color subcarrier frequency), 4 samples are processed as one set. Also, in the case when the television data obtained by the sampling are used as the television data on the lower scanning line, the phase inversion treatment of the television data becomes necessary. Even in this case, by carrying out the treatment in units of one period, the structure can be simplified. Therefore, it becomes possible to achieve reduction of the production cost of the apparatus.

What is claimed is:

1. A video signal processing apparatus in which a video signal superimposed on a carrier signal is processed by digitizing, comprising:
   (a) sample data forming means for forming n sample data per period of said carrier signal (where n is a positive integer) by sampling said video signal by a sampling frequency which is about n times the frequency of said carrier signal;
   (b) memory means for memorizing the sample data formed by said sample data forming means; and
   (c) write/read control means arranged to memorize the sample data formed by said sample data forming means and to read out, from said memory means, the sample data formed by said sample data forming means to be memorized in said memory means in such a manner that the same n sample data corresponding to one period of said carrier signal are read out and outputted in a reading sequence different from that at the time of memorizing, for m times (where m is an integer of not less than 2), depending upon the magnitude of enlargement of the image size.

2. An apparatus according to claim 1, wherein said memory means includes a memory circuit.

3. An apparatus according to claim 2, wherein said write/read control means includes:
   (a) a write control circuit for performing memorizing of the sample data by indicating write addresses to said memory circuit which are memorized; and
   (b) a read control circuit for reading out, from said memory circuit, the sample data formed by said sample data forming means to be memorized in said memory means in such a manner that the addresses corresponding to one period of said carrier signal are assigned to said memory circuit in a sequence different from that at the time of memorizing, for m times (where m is an integer of not less than 2), depending upon the magnitude of enlargement of the image size.

4. A video signal processing apparatus in which a video signal superimposed on a carrier signal is processed by digitizing, comprising:
   (a) sample data forming means for forming n sample data per period of said carrier signal (where n is a positive integer) by sampling said video signal by a sampling frequency which is about n times the frequency of said carrier signal;
   (b) memory means for memorizing the sample data formed by said sample data forming means;
   (c) write/read control means arranged to memorize the sample data formed by said sample data forming means and to read out, from said memory means, the sample data formed by said sample data forming means to be memorized in said memory means in such a manner that the same n sample data corresponding to one period of said carrier signal are read out and outputted in a reading sequence different from that at the time of memorizing, for m times (where m is an integer of not less than 2), depending upon the magnitude of enlargement of the image size;
   (d) inverted phase sample data forming means for forming the inverted sample data of the reverse phase to that of the sample data read out from said memory means by using the sample data read out from said memory means; and
   (e) output means for outputting the inverted phase sample data formed by said inverted phase sample data forming means on alternate prescribed periods.

5. An apparatus according to claim 4, wherein said video signal is constructed with a plurality of horizontal scanning line signals, and said output means is arranged so that the inverted phase sample data formed by said inverted phase sample data forming means are outputted on every other corresponding sample data period to one horizontal scanning line signal.

* * * * *